United States Patent
Du et al.

(10) Patent No.: US 9,460,331 B2
(45) Date of Patent: Oct. 4, 2016

(54) COLOR FILTER SUBSTRATE, ARRAY SUBSTRATE AND DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventors: Lingxiao Du, Shanghai (CN); Jun Ma, Shanghai (CN); Qijun Yao, Shanghai (CN)

(73) Assignees: Shanghai Tianma Micro-Electronics Co., Ltd., Shanghai (CN); Tianma Micro-Electronics Co., Ltd., Shenzhen (CN)

( * ) Notice: Subject to any disclaimer, the term of this patent is extended or adjusted under 35 U.S.C. 154(b) by 0 days.

(21) Appl. No.: 14/472,774

(22) Filed: Aug. 29, 2014

(65) Prior Publication Data
US 2015/0332080 A1 Nov. 19, 2015

(30) Foreign Application Priority Data
May 19, 2014 (CN) .......................... 2014 1 0211538

(51) Int. Cl.
*G06K 9/00* (2006.01)
*G06F 3/042* (2006.01)

(52) U.S. Cl.
CPC .............. *G06K 9/0002* (2013.01); *G06F 3/042* (2013.01); *G06K 9/00033* (2013.01)

(58) Field of Classification Search
USPC ....... 382/115, 116, 124, 209, 278; 340/5.53, 340/5.83
See application file for complete search history.

(56) References Cited

U.S. PATENT DOCUMENTS

| | | | |
|---|---|---|---|
| 6,049,620 A | 4/2000 | Dickinson et al. | |
| 7,166,966 B2* | 1/2007 | Naugler, Jr. ........ | G06F 3/03542 257/E27.129 |
| 7,364,673 B2* | 4/2008 | Arsenault .............. | B82Y 20/00 117/70 |
| 7,408,135 B2* | 8/2008 | Fujieda ................. | G06F 1/1626 250/208.1 |
| 7,616,376 B2* | 11/2009 | Arsenault .............. | B82Y 20/00 252/582 |
| 7,826,131 B2* | 11/2010 | Arsenault .............. | B82Y 20/00 252/582 |
| 7,915,648 B2* | 3/2011 | Otani .................... | H01L 31/112 257/219 |
| 8,218,108 B2* | 7/2012 | Nakai ................ | G02F 1/133502 349/106 |
| 8,330,909 B2* | 12/2012 | Yoshida .............. | G02F 1/13318 349/106 |
| 8,441,422 B2* | 5/2013 | Abileah .............. | G02F 1/13338 345/102 |
| 8,570,449 B2* | 10/2013 | Abileah .............. | G02F 1/13338 345/173 |
| 8,575,713 B2* | 11/2013 | Makita ................ | H01L 27/1214 257/458 |

FOREIGN PATENT DOCUMENTS

CN 102566840 A 7/2012

* cited by examiner

*Primary Examiner* — Yosef Kassa
(74) *Attorney, Agent, or Firm* — Alston & Bird LLP (57) ABSTRACT

A color filter substrate, an array substrate, and a display device are disclosed. The color filter substrate, array substrate, and the display device include a substrate having a display region and a non-display region, a color filter layer located in the display region and configured to filter light, and a fingerprint sensing layer located in the non-display region and configured to sense and identify a fingerprint.

23 Claims, 9 Drawing Sheets

COLOR FILTER SUBSTRATE, ARRAY SUBSTRATE AND DISPLAY DEVICE

CROSS-REFERENCES TO RELATED APPLICATIONS

This application claims the benefit of priority to Chinese Patent Application No. 201410211538.7, filed with the Chinese Patent Office on May 19, 2014 and entitled "COLOR FILTER SUBSTRATE, ARRAY SUBSTRATE AND DISPLAY DEVICE", the content of which is incorporated herein by reference in its entirety.

TECHNICAL FIELD

The present disclosure relates to the field of displaying, and more particularly, to a color filter substrate, an array substrate and a display device.

BACKGROUND OF THE INVENTION

Fingerprints are inherent and invariant features of the human body, which consist of a series of valleys and ridges on skins of finger tips. Each person has unique fingerprints, which may be distinguished from the fingerprints of others. Therefore, the fingerprints may be used in personal identity verification.

The existing fingerprint identification devices usually include optical fingerprint sensing devices and semiconductor fingerprint sensing devices. The optical fingerprint sensing devices are limited in application due to their large volumes. While the semiconductor fingerprint sensing devices are widely applied to various electronic apparatus thanks to their advantages such as low costs, small volumes, and high identification rates. A series of improved functions may be caused by combining the semiconductor fingerprint sensing device and a display device. For example, the display device may be turned on or turned off safely with the help of the fingerprint identification device.

In the conventional art, the display device and the fingerprint identification device are usually combined through a simply stacking, for example, the display device and the fingerprint identification device are arranged in a shell of one electronic apparatus. The simple stacking may result in thicker or larger electronic apparatuses and higher costs.

BRIEF SUMMARY OF THE INVENTION

One inventive aspect is a color filter substrate. The color filter substrate includes a substrate having a display region and a non-display region, a color filter layer located in the display region and configured to filter light, and a fingerprint sensing layer located in the non-display region and configured to sense and identify a fingerprint.

Another inventive aspect is an array substrate. The array substrate includes a substrate having a display region and a non-display region, a pixel driving layer located in the display region and configured to drive and control a pixel, and a fingerprint sensing layer located in the non-display region and configured to sense and identify a fingerprint.

Another inventive aspect is a display device. The display device includes a first substrate having a first display region and a first non-display region, a second substrate arranged opposite to the first substrate and having a second display region and a second non-display region, and a pixel driving layer located in the second display region and configured to drive and control a pixel. The display device also includes a fingerprint sensing layer located in the first non-display region or in the second non-display region and configured to sense and identify a fingerprint.

DETAILED DESCRIPTION OF THE PREFERRED EMBODIMENTS

As described in the background, in a conventional display device having a function of fingerprint identification, a fingerprint identification device is provided in a shell of the display device. Therefore, the thickness and the volume of the display device are increased, and the cost is raised.

Accordingly, a color filter substrate, an array substrate and a display device are provided in the disclosure. A fingerprint sensing layer is integrated on an upper surface or a lower surface of the color filter substrate and is located in the non-display region of the color filter substrate. A fingerprint sensing layer is integrated on an upper surface or a lower surface of the array substrate and is located in the non-display region of the array substrate. A fingerprint sensing layer is integrated on at least one of a first substrate and a second substrate of the display device. The first substrate and the second substrate are opposite to each other. With each of the color filter substrate, the array substrate and the display device provided in the disclosure, a function of touching and identifying may be achieved without increasing the thickness or the volume of the display device, and a cost of the display device having a function of touching and identifying is reduced.

It should be noted that in the specification, an upper surface of a structure refers to a surface facing a user, and a lower surface of a structure refers to a surface away from the user.

To make the features and advantages of the disclosure more apparent and understandable, embodiments of the disclosure are detailed hereinafter in conjunction with drawings.

Figure 1:
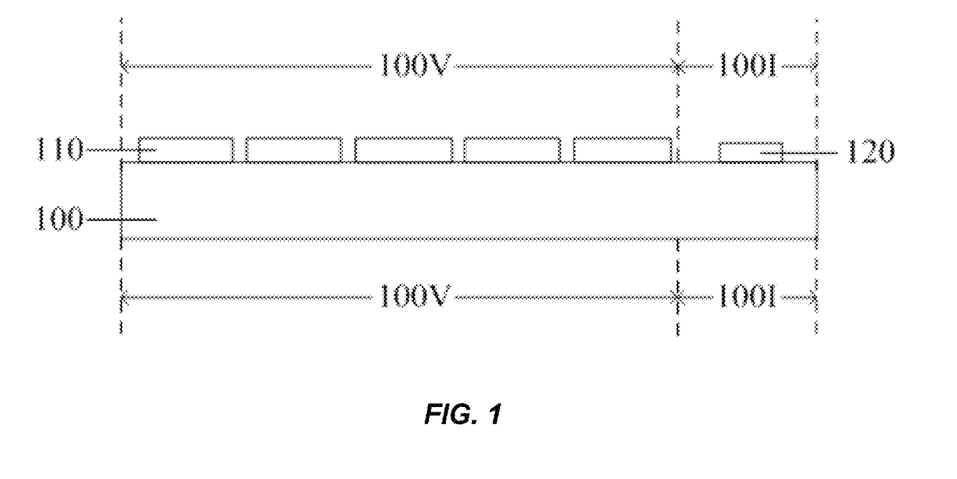
FIG. 1 is a schematic sectional view of a color filter substrate according to an embodiment of the disclosure.

A color filter substrate is provided according to an embodiment of the disclosure. FIG. 1 shows a sectional view of the color filter substrate. The color filter substrate includes a substrate 100 having a display region 100V and a non-display region 100I. The substrate 100 is divided into two adjacent portions by the display region 100V and the non-display region 100I. The substrate 100 has an upper surface (not shown in FIG. 1) and a lower surface (not shown in FIG. 1). Portions of the upper surface and the lower surface located in the display region 100V have a same area and are arranged opposite to each other. Portions of the upper surface and the lower surface located in the non-display region 100I have a same area and are arranged opposite to each other.

As shown in FIG. 1, the color filter substrate further includes a touch layer 110. The touch layer 110 is located on the upper surface of the substrate 100 and is located in the display region 100V. The touch layer 110 is for detecting a touch operation. The touch operation generally refers to an input operation performed by approaching or touching a surface of a display device by a finger or a touch stylus, where the color filter substrate is assembled in the display device.

As shown in FIG. 1, the color filter substrate further includes a fingerprint sensing layer 120. The fingerprint sensing layer 120 is located in the non-display region 100I and is located on the upper surface of the substrate 100. The fingerprint sensing layer 120 is for sensing and identifying a fingerprint. The sensing and identifying the fingerprint generally refers to a collection and an identification processing performed on a corresponding fingerprint by the fingerprint sensing layer 120 in the case that a finger approaches or presses a subsequently formed display device, where the color filter substrate is assembled in the display device. A structure, a property and a principle of the fingerprint sensing layer 120 are further described hereinafter in conjunction with FIG. 2, FIG. 3, and FIG. 4 in the specification.

Although not shown in FIG. 1, the color filter substrate may further include a color filter layer. The color filter layer is provided in the display region 100V and is for filtering light. The color filter layer may include a black matrix and color units arranged in grids of the black matrix. The color units at least include red (R) units, green (G) units and blue (B) units, and the color units may further include white (W) units, yellow (Y) units or the like.

The color filter layer may be arranged either on the upper surface or on the lower surface of the substrate 100. In the case that the color filter layer is located on the upper surface of the substrate 100, the touch layer 110 may be located in the color filter layer, or arranged above the color filter layer, or located between the color filter layer and the substrate 100. In the case that the touch layer 110 is located in the color filter layer, the touch layer 110 may be located between the black matrix and the color units.

According to the embodiment, since the fingerprint sensing layer 120 is integrated in the non-display region 100I of the color filter substrate, a display device subsequently formed with the color filter substrate has a function of sensing and identifying the fingerprint. Since the fingerprint sensing layer 120 is integrated on the substrate 100 of the color filter substrate, the thickness and the volume of the display device are barely increased. Furthermore, since no substrate is required for supporting the fingerprint sensing layer 120, a cost of the display device is saved.

Since the touch layer 110 is further integrated in the display region 100V of the color filter substrate, the color filter substrate further has a touch detection function besides a fingerprint identification function. Therefore, the display device subsequently formed with the color filter substrate has a more powerful capability and a wider application.

Figure 2:
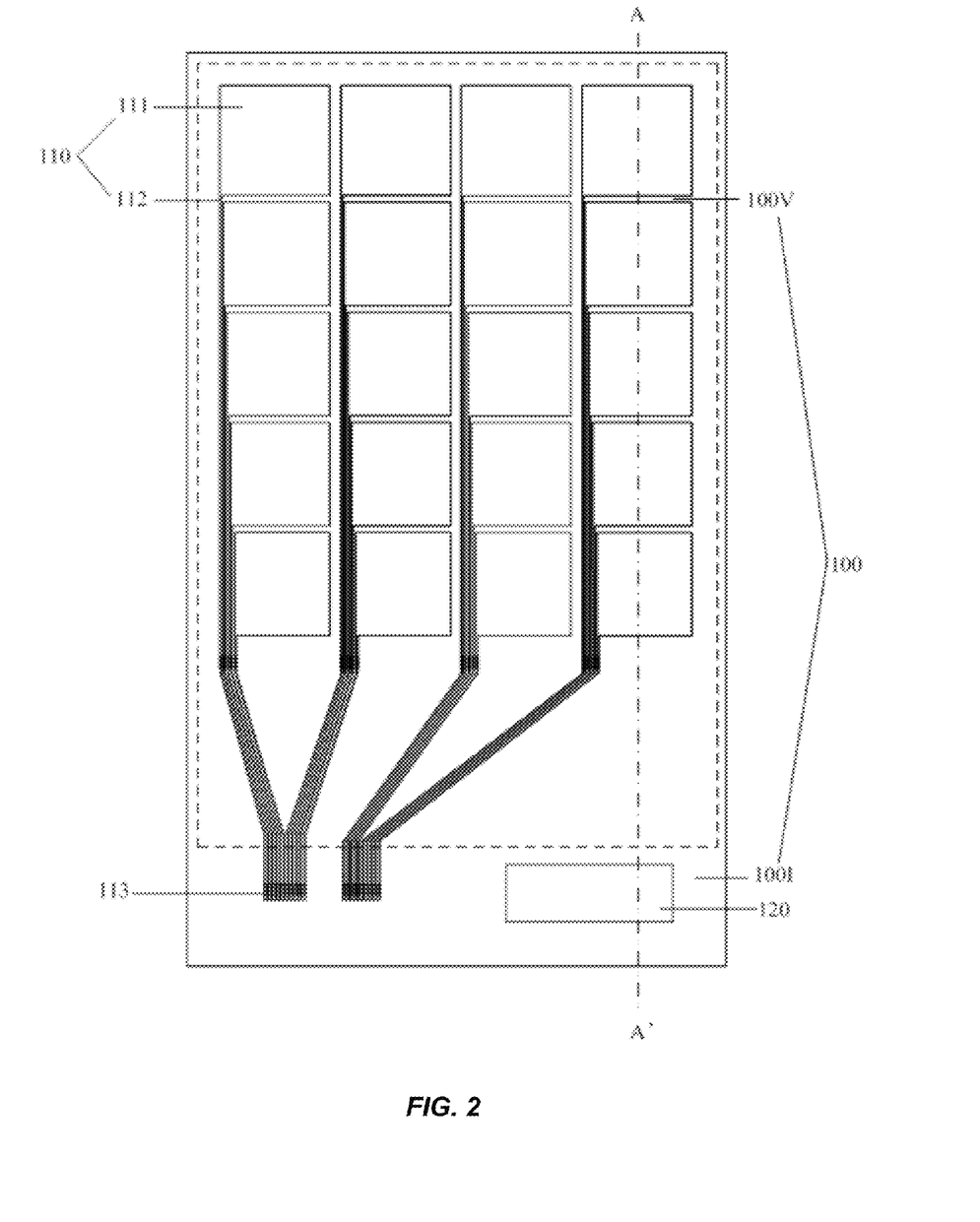
FIG. 2 is a schematic plan view of the color filter substrate shown in FIG. 1.

FIG. 2 is a schematic plan view of the color filter substrate shown in FIG. 1. There is a dotted line A-A' in FIG. 2, and FIG. 1 may be taken along the dotted line A-A' in FIG. 2.

As shown in FIG. 2, in the color filter substrate, the upper surface of the substrate 100 may be divided into the display region 100V (shown in a dotted block in FIG. 2) and the non-display region 100I, where the display region 100V is provided with the touch layer 110. The touch layer 110 includes multiple touch electrodes 111 arranged in a matrix and wires 112 connected to the touch electrodes 111. The touch layer 110 further includes pins 113 located in the non-display region 100I. All the touch electrodes 111 are electrically connected to the pins 113 via the wires 112.

The fingerprint sensing layer 120 located in the non-display region 100I of the color filter substrate is also shown in FIG. 2. According to the embodiment, the fingerprint sensing layer 120 may be a scratch-type fingerprint sensing layer. With the scratch-type fingerprint sensing layer, a finger of a user scratches above the fingerprint sensing layer, and gradually, each part of the fingerprint faces the fingerprint sensing layer. Then collected images are spliced to obtain a complete image by a program, thereby achieving a collection and an identification of the fingerprint.

Since the fingerprint sensing layer 120 is scratch-type, a size of the fingerprint sensing layer 120 may be determined based on a required accuracy for fingerprint identification. If the fingerprint sensing layer 120 has a small area, the accuracy for fingerprint identification is low. Thus, to ensure a high accuracy for fingerprint identification, the fingerprint sensing layer is required to have a large area. On the other hand, an area of the fingerprint sensing layer should not be oversized to avoid an unnecessary waste. A length of the fingerprint sensing layer 120 may range from 5 mm to 10 mm and a width of the fingerprint sensing layer 120 may range from 0.05 mm to 5 mm.

Figure 3:
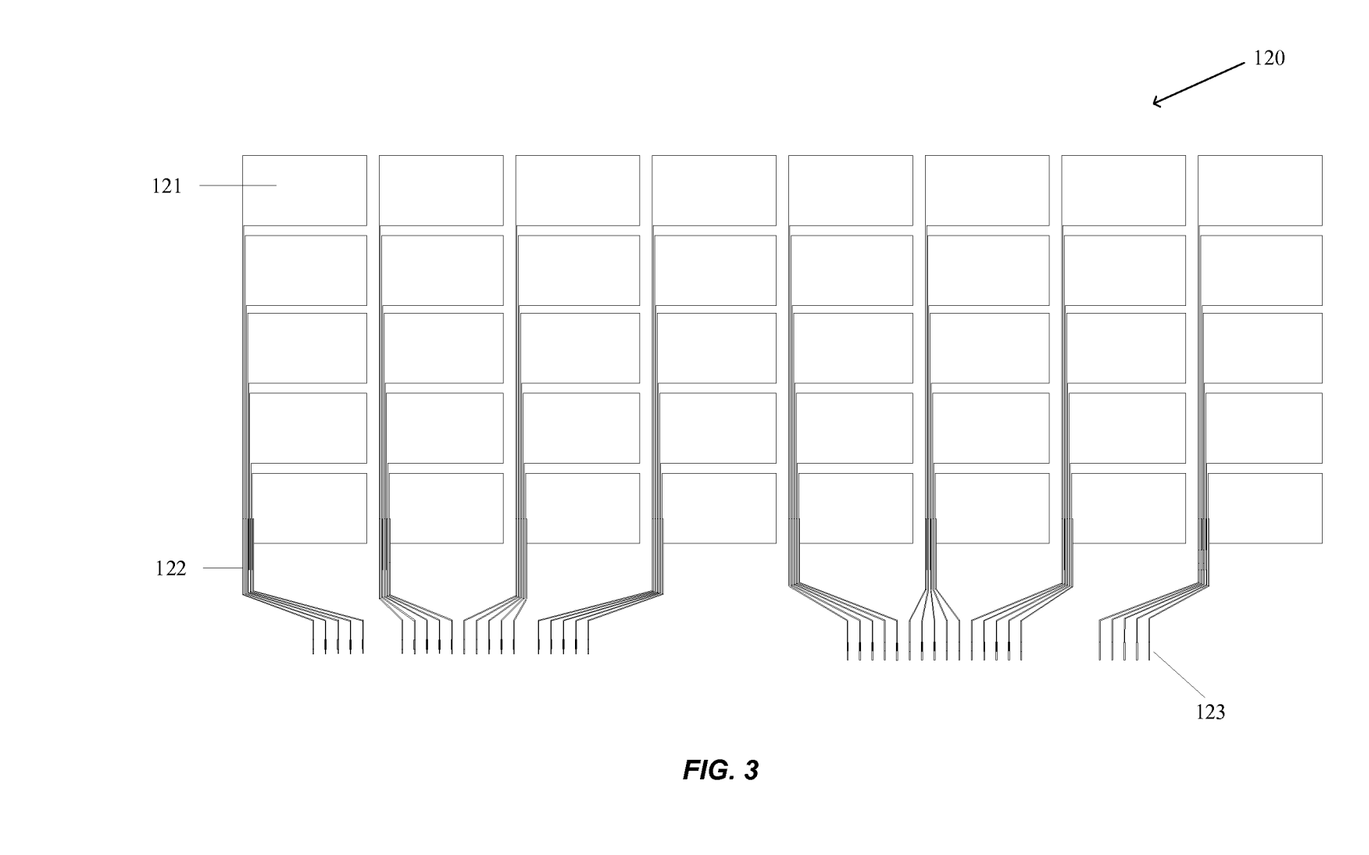
FIG. 3 is a schematic enlarged diagram of a fingerprint sensing layer in the color filter substrate shown in FIG. 2.

FIG. 3 is a schematic enlarged diagram of the fingerprint sensing layer 120 shown in FIG. 2. The fingerprint sensing layer 120 includes multiple fingerprint sensing units 121 arranged in an array. The respective fingerprint sensing units 121 are electrically connected to pins 123 via wires 122, and the pins 123 are electrically connected to a driver chip (not shown in FIG. 3).

The fingerprint sensing unit 121 needs to have a function of position reporting, and an area of the fingerprint sensing unit 121 generally needs to be equal to or larger than 20 µm×20 µm. For a fingerprint sensing unit with a too small area, an accuracy in fingerprint detection may be influenced. For a fingerprint sensing unit with a too large area, a processing on a gray scale of a fingerprint image may be influenced. Each fingerprint sensing unit 121 may have a length ranging from 20 µm to 100 µm and a width ranging from 20 µm to 100 µm, i.e., each fingerprint sensing unit 121 has an area ranging from 20 µm×20 µm to 100 µm×100 µm.

The number of the fingerprint sensing units 121 may be determined by a required accuracy of fingerprint identification, for example, ranges from 50 to 500. According to a preferred embodiment, 200 fingerprint sensing units 121 may be provided and arranged in an array of 4×50.

The fingerprint sensing units 121 may be made of a transparent conductive metal oxide such as indium tin oxide (ITO) or zinc oxide (ZnO). Since the fingerprint sensing units 121 are located in the non-display region 100I, the fingerprint sensing units 121 may be made of a metal such as copper, aluminum, silver or tungsten. A signal detection function may be improved due to a better conductivity of the metal.

The wires 122 may be made of a transparent conductive metal oxide such as ITO or ZnO, or the wires 122 may be made of copper, aluminum, silver, tungsten or the like.

The wires 122 and the fingerprint sensing units 121 may be located in a same layer. Alternatively, the wires 122 and the fingerprint sensing units 121 may be located in different layers, to improve a sensitivity of the fingerprint identification. For example, the wires 122 may be separated from the fingerprint sensing units 121 by an insulating layer, and the wires 122 may be electrically connected to the fingerprint sensing units 121 through a hole.

It should be noted that, according to other embodiments of the disclosure, the fingerprint sensing layer may have other inner structures, for example, the fingerprint sensing units may be triangular, pentagonal or hexagonal. There also may be other connection modes for the wires, for example, the wires are leaded out from two sides of one row or one column of fingerprint sensing units, thereby decreasing an area occupied by the wires and increasing an effective sensing area of the fingerprint sensing layer. The inner structure of the fingerprint sensing layer is not limited in the disclosure.

According to the embodiment, the fingerprint sensing layer 120 is a single layer. Therefore, the fingerprint sensing layer 120 has a simple structure, a manufacturing process is simple and a cost is low.

It should be noted that, according to other embodiments of the disclosure, the fingerprint sensing layer may have a multiple-layer structure. For example, the fingerprint sensing units are located on an upper surface of an insulating layer, and the wires are located on a lower surface of the insulating layer. Respective fingerprint sensing units and respective wires are electrically connected by a conductive material penetrating through the insulating layer.

According to the embodiment, since both the touch layer 110 and the fingerprint sensing layer 120 are located on the upper surface of the substrate 100 and are formed of a same material, the touch layer 110 and the fingerprint sensing layer 120 may be manufactured with a same process. For example, the touch units 111 of the touch layer 110 and the fingerprint sensing units 121 of the fingerprint sensing layer 120 are simultaneously manufactured in a same process, and the wires 112 connected to the touch units 111 and the wires 122 connected to the fingerprint sensing units 121 are simultaneously manufactured in a same process. Therefore, processes are simplified and a cost is saved.

It should be noted that, according to other embodiments of the disclosure, the touch layer may have other structures, for example, the touch electrodes may be triangular, pentagonal or hexagonal. The wires connected to the touch units may have other connection modes, for example, the wires are leaded out from two sides of one row or one column of touch electrodes.

In a color filter substrate according to other embodiments of the disclosure, the touch layer may be located on the lower surface of the substrate. In this case, the fingerprint sensing layer may be located on either the upper surface or the lower surface of the substrate. In the case that the fingerprint sensing layer is located on the lower surface of the substrate, the touch layer and the fingerprint sensing layer are located on a same layer of the substrate, and the fingerprint sensing layer and the touch layer may be manufactured in a same process. Therefore, processes are simplified and a cost is saved. In the case that the fingerprint sensing layer is located on the upper surface of the substrate, the touch layer and the fingerprint sensing layer are located on different surfaces of the substrate, and thus an interaction between the touch layer and the fingerprint sensing layer may be reduced. The touch layer may have a multiple-layer structure. The multiple-layer touch layer may be located on the upper surface or the lower surface of the substrate, or may be located on both the upper surface and the lower surface of the substrate. A structure and a position of the touch layer are not limited in the disclosure.

It should be noted that, in a color filter substrate according to other embodiments of the disclosure, there may be no touch layer. In this case, the color filter substrate is still provided with the fingerprint sensing layer. Compared with a conventional display device, in the case that the color filter substrate is provided with no touch layer, a whole display device still has a function of sensing and identifying a fingerprint, a structure of the display device is compact and a cost is reduced.

Figure 4:
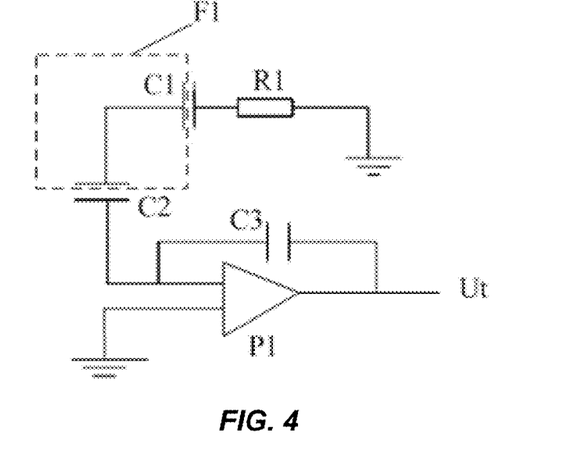
FIG. 4 is an equivalent detection circuit of a fingerprint sensing unit shown in FIG. 3 and a finger.

FIG. 4 is an equivalent detection circuit of a finger F1 (shown in the dashed block in FIG. 4) and the fingerprint sensing unit 121. A first capacitor C1 and an equivalent resistor R1 are generated between the finger F1 and the ground. During identifying the fingerprint with the sensing layer 120, each fingerprint sensing unit 121 is coupled with the finger F1 (including valleys and ridges of the fingerprint) to generate a second capacitor C2. The equivalent detection circuit is further provided with an operational amplifier P1. One input end of the operational amplifier P1 is connected to the fingerprint sensing unit 121, and the other input end of the operational amplifier P1 is connected to the ground. An output end of the operational amplifier P1 outputs a voltage Ut. A third capacitor C3 is formed between the fingerprint sensing unit 121 and the output end of the operational amplifier P1.

In one cycle of identifying and detecting the fingerprint, respective fingerprint sensing units 121 face different parts of the fingerprint of the finger F1. Some of the fingerprint sensing units 121 face the valleys of the fingerprint, while some of the fingerprint sensing units 121 face the ridges of the fingerprint). Therefore, the second capacitors C2 formed by coupling different fingerprint sensing units 121 with the finger F1 have different capacitances.

Figure 5:
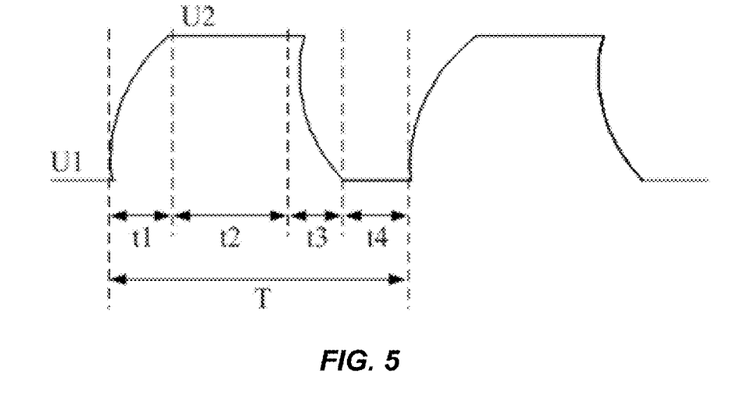
FIG. 5 illustrates an excitation signal received by the fingerprint sensing layer shown in FIG. 3.

FIG. 5 shows a changing voltage of each capacitor during one detection cycle T. In a first stage t1 of the detection cycle T, at an initial time instant of the first stage t1, the voltage of each capacitor is with an initial value U1. An excitation signal is sent to each fingerprint sensing unit 121 by the driver chip over time, and the excitation signal is received by each fingerprint sensing unit 121. Accordingly, each capacitor begins to be charged, and the voltage of each capacitor is gradually raised to a maximum U2 from the initial value U1. In a second stage t2 of the detection cycle T, the voltage of each capacitor remains at the maximum U2 to ensure that each capacitor is charged to a steady state. In a third stage t3 of the detection cycle T, the fingerprint sensing unit 121 receive a discharge signal, and thus the capacitor begins to discharge. The voltage of each capacitor is gradually decreased to the initial value U1 from the maximum U2 and a sensing signal is generated. In a fourth stage t4 of the detection cycle T, the voltage of each capacitor remains at the initial value U1. On one hand, the capacitor is discharged safely; on the other hand, a sufficient interval is ensured between two detection cycles. Through the first stage t1, the second stage t2, and the third stage t3, the fingerprint sensing unit 121 is coupled with the finger in response to the excitation signal initially sent by the driver chip, and the sensing signal is generated. The sensing signal is received and sent to the driver chip, by the fingerprint sensing unit 121. Fingerprint information is acquired by the driver chip based on the sensing signal. Where the initial value U1 of the voltage may be zero volt.

In the first stage t1 of the detection cycle T, although the voltage of each second capacitor C2 reaches the maximum U2, the second capacitors C2 store different quantities of electric charge since each second capacitor C2 has a different capacitance. Similarly, in the third stage t3 of the detection cycle T, although each second capacitor C2 has a same voltage change, i.e., U2-U1, since each second capacitor C2 has a different capacitance, each second capacitor C2 discharges a different quantity of electric charge. That is, each fingerprint sensing unit 121 receives a different sensing signal. In processing the sensing signals, the sensing signals may be amplified by a signal amplifier or the like, and the amplified sensing signals are sent to the driver chip. The driver chip acquires, through operating, quantities of electric charges discharged by respective second capacitors C2, and capacitances of the second capacitors C2 formed between respective fingerprint sensing units 121 and the fingerprint are further acquired. Whether each fingerprint sensing unit 121 faces a valley or a ridge of the fingerprint is determined based on the capacitances of the capacitors, and accordingly, the fingerprint information is acquired.

Figure 6:
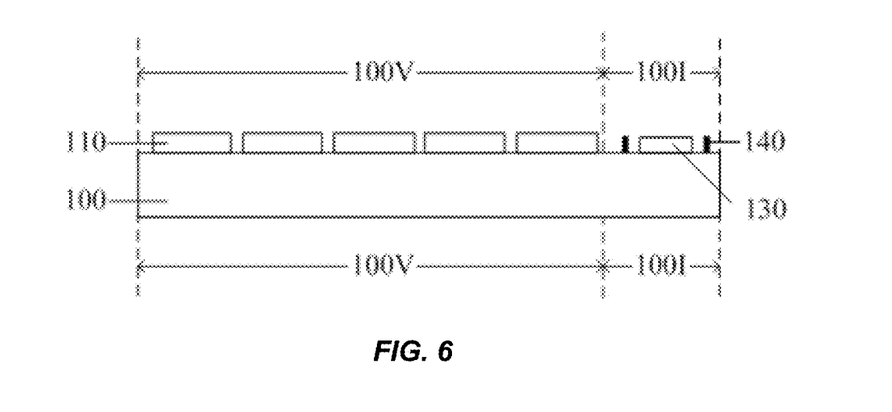
FIG. 6 is a schematic sectional view of a color filter substrate according to another embodiment of the disclosure.

As shown in FIG. 6, a color filter substrate is provided according to another embodiment of the disclosure. The color filter substrate is generally same as the color filter substrate according to the foregoing embodiment. The color filter substrate includes a substrate 100, having a display region 100V and a non-display region 100I adjacent to each other. The color filter substrate further includes a touch layer 110, which is located on an upper surface of the substrate 100 and located in the display region 100V. The color filter substrate further includes a fingerprint sensing layer 130, which is located on the upper surface of the substrate 100 and located in the non-display region 100I. The fingerprint sensing layer 130 is for sensing and identifying a fingerprint. Positions and properties of respective structures in the color filter substrate according to the embodiment may be referred to corresponding descriptions in the above-described embodiment.

As shown in FIG. 6, different from the above-described embodiment, the color filter substrate according to the embodiment is further provided with a conductive coil 140. The conductive coil 140 is arranged around the fingerprint sensing layer 130.

Figure 7:
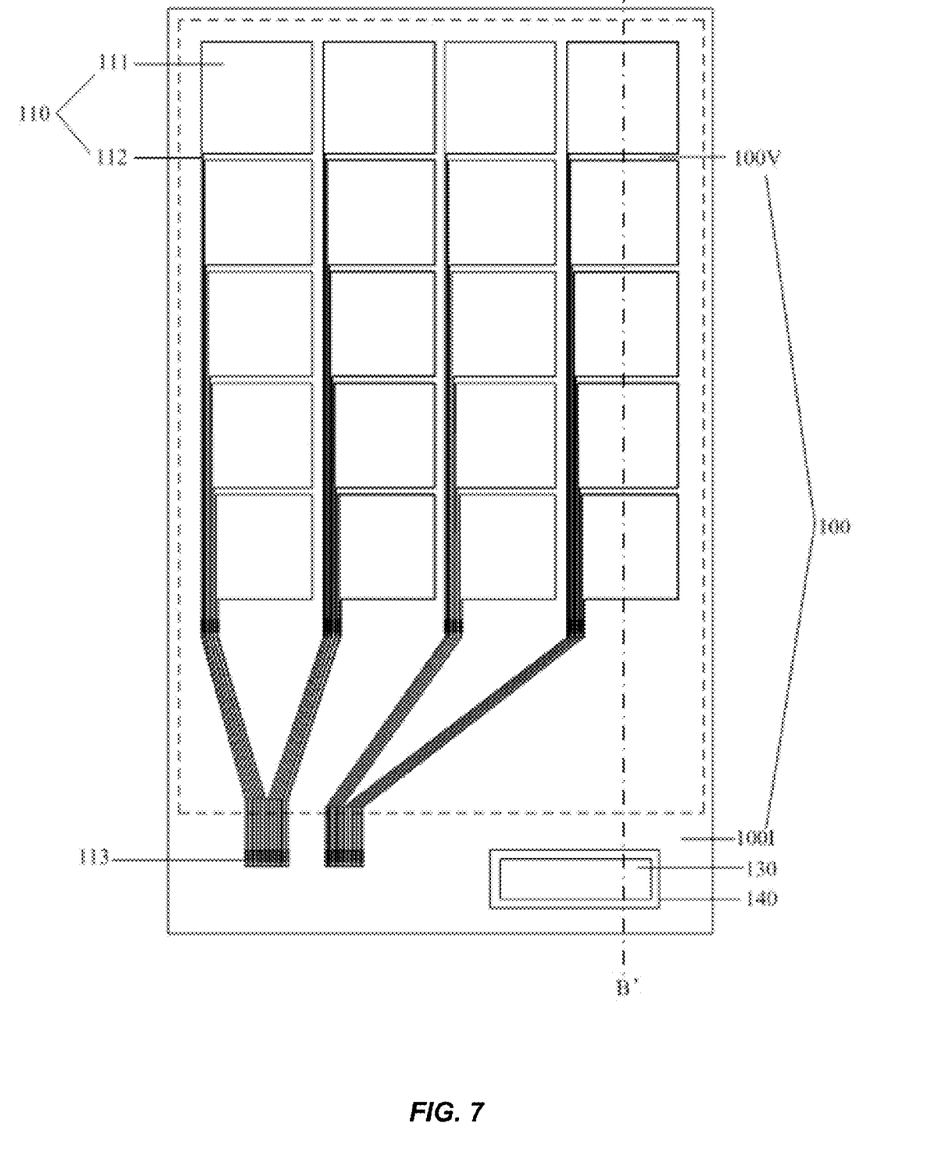
FIG. 7 is a schematic plan view of the color filter substrate shown in FIG. 6.

FIG. 7 is a schematic plan view of the color filter substrate shown in FIG. 6. There is dotted line B-B' in FIG. 7, and FIG. 6 may be taken along the dotted line B-B' shown in FIG. 7.

As shown in FIG. 7, in the color filter substrate, the upper surface of the substrate 100 is divided into two portions, i.e., the display region 100V (shown in a dashed block in FIG. 7) and the non-display region 100I. The display region 100V is provided with the touch layer 110. The touch layer 110 includes multiple touch electrodes 111 arranged in a matrix and wires 112 connected to the touch electrodes 111. The touch layer 110 further includes pins 113 located in the non-display region 100I. All the touch electrodes 111 are electrically connected to the pins 113 via the wires 112. Each fingerprint sensing unit 111 may be electrically connected to a driver chip (not shown in FIG. 7) via the wire 112. The conductive coil 140 and the fingerprint sensing layer 130 are located in the non-display region of the color filter substrate. As shown in FIG. 7, the conductive coil 140 surrounds the fingerprint sensing layer 130. The conductive coil 140 is also electrically connected to the driver chip (not shown in FIG. 7).

According to the embodiment, the conductive coil 140 and the fingerprint sensing layer 130 are located on a same surface of the substrate, i.e., on the upper surface or on a lower surface. According to other embodiments of the disclosure, the conductive coil 140 and the fingerprint sensing layer 130 may be located on different surfaces of the substrate.

Figure 8:
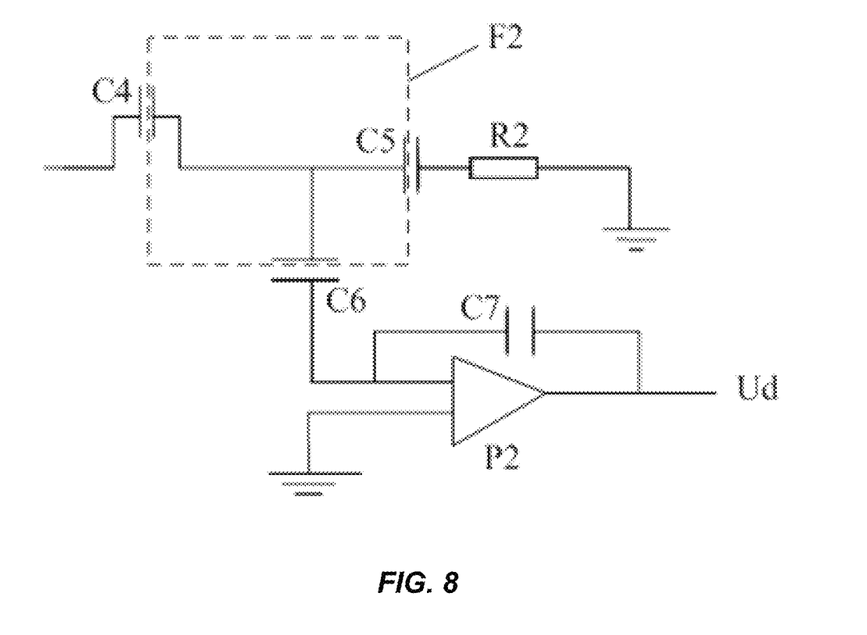
FIG. 8 is a principle diagram of a sensing circuit formed by a fingerprint sensing layer and a conductive coil shown in FIG. 7 and a finger.

FIG. 8 shows an equivalent detection circuit of a finger F2 (shown in a dashed block in FIG. 8), the conductive coil 140 and the fingerprint sensing unit. During identifying a fingerprint with the fingerprint sensing layer 130, an excitation signal is sent to the conductive coil 140 by the driver chip. The excitation signal is transmitted from the conductive coil 140 to the finger F2 to make the finger F2 carry an electric signal. The finger F2 is grounded, and an equivalent resistor R2 is generated between the finger F2 and the ground. Since the finger F2 carries the electric signal, a fourth capacitor C4 is formed by coupling the finger F2 with the conductive coil 140, a fifth capacitor C5 is formed by coupling the finger F2 with the ground, and a sixth capacitor C6 is formed by coupling the finger F2 with the fingerprint sensing unit, i.e., multiple sixth capacitors C6 are formed between the fingerprint of the finger F2 and the whole fingerprint sensing layer 130. The detection circuit is provided with an operational amplifier P2. One input end of the operational amplifier P2 is connected to the fingerprint sensing unit, and the other input end of the operational amplifier P2 is connected to the ground. An output end of the operational amplifier P2 outputs a voltage Ud. And a seventh capacitor C7 is formed between the fingerprint sensing unit and the output end of the operational amplifier P2.

As shown in FIG. 8, in a stage of sending the excitation signal to the finger F2 by the conductive coil 140, the fourth capacitor C4 between the finger F2 and the conductive coil 140 is charged by the circuit. At the end of a charging, the fingerprint sensing unit detects a change of quantities of electric charges between the finger F2 and the fingerprint sensing unit, and sends information of the change of the quantities of the electric charges to the driver chip. That is, the finger F2 is coupled with the fingerprint sensing unit in response to the excitation signal, to generate a sensing signal, and the sensing signal is received and sent to the driver chip, by the fingerprint sensing unit. Since capacitances of the capacitors formed by valleys and ridges of the fingerprint and the fingerprint sensing units are different, the voltages Ud output from the output ends are different. Different capacitances of the sixth capacitors C6 may be acquired based on the different voltages Ud. The driver chip may acquire multiple capacitances of the sixth capacitors C6 based on multiple sensing signals, and accordingly, fingerprint information is acquired.

Figure 9:
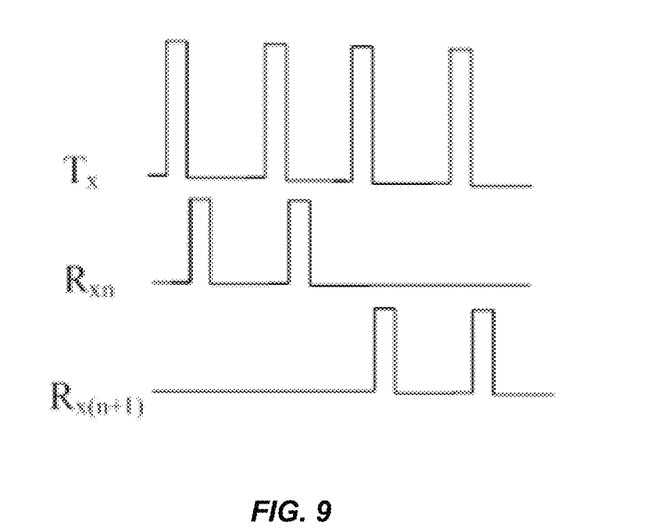
FIG. 9 is schematic diagram of an excitation signal curve of a conductive coil shown in FIG. 7 and a sensing signal curve of a fingerprint sensing unit.

FIG. 9 shows an excitation signal curve and a sensing signal curve. An excitation signal curve Tx is a curve of the excitation signal sent by the conductive coil 140, a sensing signal curve Rx is a curve of the sensing signal received by one fingerprint sensing unit, and a sensing signal curve Rx (n+1) is a curve of the sensing signal received by another fingerprint sensing unit. As shown in FIG. 9, the excitation signal sent by the conductive coil 140 may be a square-wave pulse voltage. The excitation signal may be sent periodically by the conductive coil 140 at a certain frequency, and the sensing signal may be sequentially received by the fingerprint sensing units in order of time. For example, in the case that first two square-wave pulses as shown in FIG. 9 are sent by the conductive coil 140, one fingerprint sensing unit receives one sensing signal after each square-wave pulse is sent, as shown in the sensing signal curve Rx. In the case that next two square-wave pulses as shown in FIG. 9 are sent by the conductive coil 140, another fingerprint sensing unit receives one sensing signal after each square-wave pulse is transmitted, as shown in the sensing signal curve Rx (n+1). It should be noted that, according to other embodiments of the disclosure, the fingerprint identification may be implemented by other approaches for signal transmitting and signal receiving.

In view of the above, for making the fingerprint identification more accurate, the conductive coil 140 is required to be close to the finger and away from the fingerprint sensing layer 130. Therefore, the conductive coil 140 may be located on the upper surface of the substrate of the color filter substrate, while the fingerprint sensing layer 130 is located on the lower surface of the substrate of the color filter substrate.

The conductive coil 140 may be made of any one of any combination of aluminum, molybdenum, niobium, copper and silver. Alternatively, the conductive coil 140 may be made of other suitable conductive materials. If the conductive coil 140 has a thickness smaller than 0.5 µm, a resistance is too big to ensure that a signal is well sent. Therefore, the conductive coil 140 may have a thickness equal to or greater than 0.5 µm.

According to the embodiment, since the conductive coil 140 surrounds the fingerprint sensing layer 130, a detection mode of the fingerprint sensing layer 130 is changed. The excitation signal is sent to the finger by the conductive coil 140, and then the sensing signal generated by coupling the finger with the fingerprint sensing unit is received. Hence, a signal-noise ratio in sensing the fingerprint is greatly raised, and accordingly, an accuracy of the fingerprint identification is improved. In other words, since the conductive coil 140 is used, a distance from the finger to the fingerprint sensing layer 130 may be increased properly. Hence, there may be more choices of positions for arranging the fingerprint sensing layer 130, and accordingly, a structure of the color filter substrate may be designed more flexibly.

Figure 10:
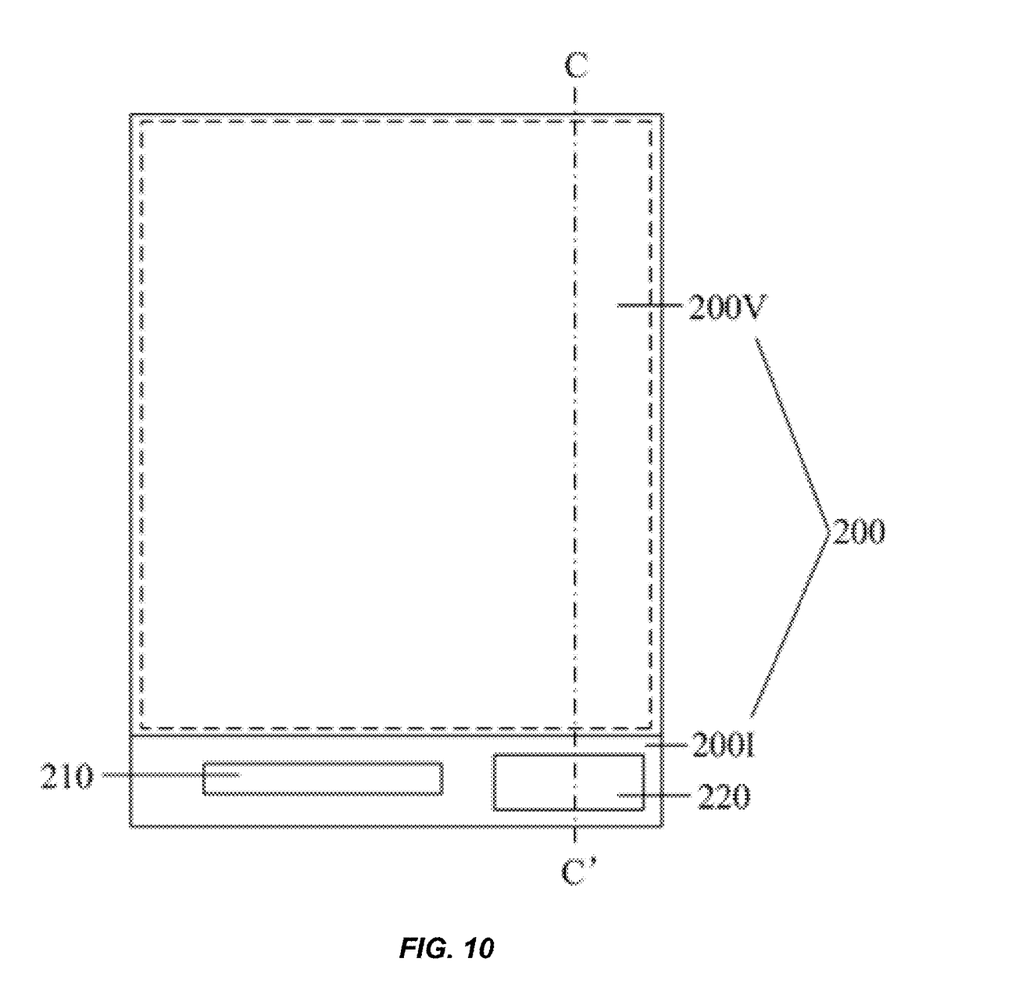
FIG. 10 is a schematic plan view of an array substrate according to an embodiment of the disclosure.

An array substrate is provided according to an embodiment of the disclosure. FIG. 10 is a schematic plan view of the array substrate. The array substrate includes a substrate 200 having an upper surface (not shown in FIG. 10) and a lower surface (not shown in FIG. 10). FIG. 10 shows the upper surface of the substrate 200. Each of the upper surface and the lower surface of the substrate 200 may be divided into a display region 200V (as shown in a dashed block in FIG. 10) and a non-display region 200I adjacent to each other.

As shown FIG. 10, the array substrate further includes a fingerprint sensing layer 220, which is located in the non-display region 200I and is located on the upper surface of the substrate 200. The fingerprint sensing layer 220 is for sensing and identifying a fingerprint. The sensing and identifying fingerprint generally refers to a collection and an identification processing performed on a corresponding fingerprint by the fingerprint sensing layer 220 in the case that a finger approaches or presses a subsequently formed display device, where the array substrate is assembled in the display device.

Figure 11:
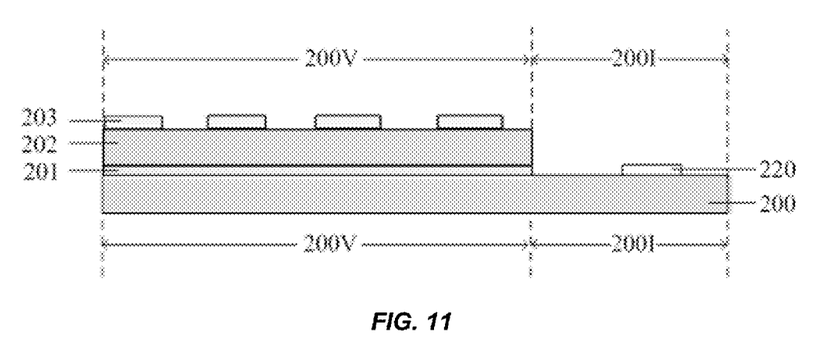
FIG. 11 is a schematic sectional view of the array substrate shown in FIG. 10.

FIG. 11 is a schematic sectional view of the array substrate taken along a dotted line C-C' in FIG. 10. As shown in FIG. 11, the array substrate further includes a pixel driving layer (unlabeled in FIG. 11), which is arranged in the display region 200V and is for driving and controlling a pixel. The pixel driving layer includes a common electrode layer 201, a passivation layer 202, a pixel electrode layer 203. The pixel electrode layer 203 may include multiple pixel electrodes. The pixel driving layer may further include multiple thin film transistors. The thin film transistors respectively control the pixel electrodes. Grate electrodes and source electrodes of the thin film transistors are respectively electrically connected to scan lines and data lines, to form a thin film transistors array. The non-display region 200I of the array substrate is further provided with a driver chip 210. The scan lines and the data lines may be electrically connected to the driver chip 210. Therefore, it is convenient to electrically connect corresponding chips later through structures such as a flexible printed circuit board.

It should be noted that, according to other embodiments of the disclosure, the fingerprint sensing layer may be located on the lower surface of the substrate, while the fingerprint sensing layer is always located in the non-display region of the substrate.

The array substrate provided in the disclosure may further include a touch layer, although it is not shown in FIG. 11. The touch layer may be located on the upper surface of the substrate and is located in the display region. The touch layer is for detecting a touch operation. According to other embodiments of the disclosure, the touch layer may reuse the common electrode layer or the pixel electrode layer. For example, the common electrode layer may further be used for a touch detection. Hence, an independent touch layer is not required, and a structure and processes are simplified. The touch layer may include multiple touch electrodes arranged in a matrix and wires connected to the touch electrodes. The touch layer may further include pins (not shown in FIG. 11) located in the non-display region. The touch electrodes are electrically connected to the pins located in the non-display region via the wires, and the pins may be electrically connected to the driver chip.

It should be noted that, according to other embodiments of the disclosure, the touch electrodes in the touch layer may be triangular, pentagonal, hexagonal, or the like. The wires may be lead out from two sides of one row or one column of touch electrodes. According to other embodiments of the disclosure, the touch layer may be located on the lower surface of the substrate. A structure and a position of the touch layer are not limited in the disclosure.

According to the embodiment, since the fingerprint sensing layer 220 is integrated in the non-display region 200I of the array substrate, a display device subsequently formed with the array substrate has a function of sensing and identifying the fingerprint. Since the fingerprint sensing layer 220 is integrated on the substrate 200 of the array substrate, the thickness and the volume of the display device are barely increased, and a cost of the display device is saved. In addition, since the touch layer is further integrated in the display region 200V of the array substrate, the array substrate may further have a touch detection function besides a fingerprint identification function. Therefore, the display device subsequently formed with the array substrate has a more powerful capability and a wider application.

According to the embodiment, an inner structure and properties of the fingerprint sensing layer may be referred to corresponding contents in foregoing embodiments. A sensing principle of the fingerprint sensing layer is same as that described according to the foregoing embodiments and may be referred to corresponding contents in the foregoing embodiments.

In the array substrate according to other embodiments of the disclosure, a conductive coil may be provided around the fingerprint sensing layer. The conductive coil may be located on the upper surface or the lower surface of the array substrate, and the conductive coil is electrically connected to the driver chip. In arranging the conductive coil, a sensing principle in which the conductive coil and the fingerprint sensing layer cooperate with each other may be referred to corresponding contents in the foregoing embodiments, which is not repeated here.

Figure 12:
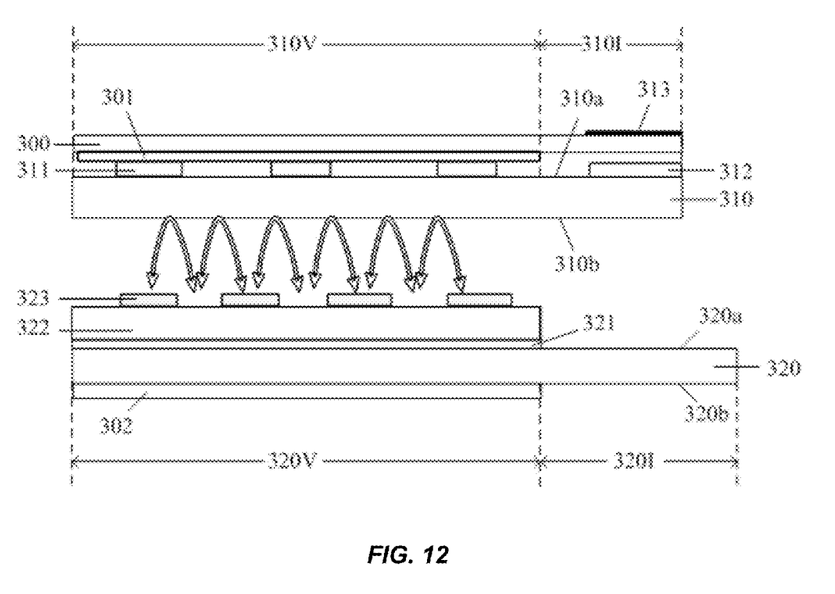
FIG. 12 is a schematic sectional view of a display device according to an embodiment of the disclosure.

As shown in FIG. 12, a display device is provided according to an embodiment of the disclosure. The display device includes: a first substrate 310 and a second substrate 320 opposite to the first substrate 310. The first substrate 310 has a first display region 310V and a first non-display region 310I, with which the first substrate 310 is divided into two adjacent portions. The first substrate 310 has a first upper surface 310a and a first lower surface 310b. The second substrate 320 has a second display region 320V and a second non-display region 320I, with which the second substrate 320 is divided into two adjacent portions. The second substrate 320 has a second upper surface 320a and a second lower surface 320b.

As shown in FIG. 12, the display device further includes a fingerprint sensing layer 312, which is located in the first non-display region 310I of the first substrate 310 and is located on the first upper surface 310a, i.e., the fingerprint sensing layer 312 is located on a surface, away from the second substrate 320, of the first substrate 310.

Since the fingerprint sensing layer 312 is located on the first upper surface 310a, away from the second substrate 320, of the first substrate 310, the fingerprint sensing layer 312 may be closer to a finger. Therefore, a detection accuracy of the fingerprint sensing layer 312 may be improved.

It should be noted that, according to other embodiments of the disclosure, the fingerprint sensing layer 312 may be located on the first lower surface 310b of the first substrate 310.

According to the embodiment, the fingerprint sensing layer 312 is a scratch-type fingerprint sensing layer. The fingerprint sensing layer may include multiple fingerprint sensing units (not shown in FIG. 12) arranged in an array. Each fingerprint sensing unit is electrically connected to a driver chip (not shown in FIG. 12) via a wire. The wires may be designed as required to make a more compact arrangement of the fingerprint sensing units.

Since the fingerprint sensing layer 312 is scratch-type, the fingerprint sensing layer 312 may have a length in a range from 5 mm to 10 mm and a width in a range from 0.05 mm to 5 mm. A size of the fingerprint sensing layer 312 may be determined based on a required accuracy of fingerprint identification.

Each fingerprint sensing unit 121 may have a length in a range from 20 μm to 100 μm and a width in a range from 20 μm to 100 μm. Since the fingerprint sensing unit needs to have a function of position reporting, an area of the fingerprint sensing unit generally needs to be equal to or larger than 20 μm×20 μm. For a fingerprint sensing unit with a too small area, an accuracy in fingerprint detection may be influenced. For a fingerprint sensing unit with a too large area, a processing on a gray scale of a fingerprint image may be influenced. Therefore, each fingerprint sensing unit 121 has an area in a range from 20 μm×20 μm to 100 μm×100 μm.

The fingerprint sensing units may be made of a transparent conductive metal oxide such as indium tin oxide (ITO) or zinc oxide (ZnO). Since the fingerprint sensing units are located in the non-display region, the fingerprint sensing units may be made of a metal such as copper, aluminum, silver or tungsten. A signal detection function may be improved due to a better conductivity of the metal.

According to the embodiment, the fingerprint sensing layer 312 may be a single layer. Therefore, the fingerprint sensing layer 312 has a simple structure, a manufacturing process is simple and thus a cost is reduced.

It should be noted that, according to other embodiments of the disclosure, the fingerprint sensing layer may have other structures, for example, the fingerprint sensing units may be triangular, pentagonal or hexagonal. There may be other connection modes for the wires, for example, the wires are leaded out from two sides of one row or one column of fingerprint sensing units. The structure of the fingerprint sensing layer is not limited in the disclosure. The wires may be located in a same layer as the fingerprint sensing units, or may be located on a different layer from the fingerprint sensing units.

As shown in FIG. 12, the display device further includes a touch layer 311 arranged in the first display region 310V of the first substrate 310. The touch layer 311 is for detecting a touch operation. The touch operation generally refers to various input operations performed by approaching or touching a surface of the display device by a finger or a touch stylus.

The touch layer 311 is also located on the first upper surface 310a of the first substrate 310. Hence, the touch layer 311 and the fingerprint sensing layer 312 may be manufactured simultaneously with a same process. Therefore, processes are simplified and a cost is saved.

The touch layer 311 may include multiple touch electrodes arranged in a matrix and wires connected to the touch electrodes. The touch layer 311 further includes pins located in the non-display region. The touch electrodes may be electrically connected to the pins located in the non-display region via the wires.

It should be noted that, according to other embodiments of the disclosure, the touch layer may have other structures, for example, the touch electrodes may be triangular, pentagonal or hexagonal. The wires connected to the touch units may have other connection modes, for example, the wires are leaded out from two sides of one row or one column of touch electrodes. According to other embodiments of the disclosure, in the case that the fingerprint sensing layer is located in the first display region of the first substrate, the touch layer may be located on the first lower surface of the first substrate, or located in the second display region of the second substrate, such as the second display region of the second upper surface. The touch layer may have a multiple-layer structure. The multiple-layer touch layer may be located one surface or may be located on different surfaces. For example, some of the multiple layers are located on a surface of the first substrate and some of the multiple layers are located on a surface of the second substrate. A structure and a position of the touch layer are not limited in the disclosure.

It should be noted that, according to other embodiments of the disclosure, there may be no touch layer in the display device. In this case, the display device is still provided with the fingerprint sensing layer. Compared with a conventional display device, the display device provided in the disclosure still has a function of sensing and identifying the fingerprint, a structure of the display device is compact and a cost is reduced.

As shown in FIG. 12, the display device further includes an outer cover plate 300 located on one side, away from the second substrate 320, of the first substrate 310. A conductive coil 313 is provided at a first portion of the outer cover plate 300. A projection of the fingerprint sensing layer 312 onto the outer cover plate 300 in a vertical direction coincides with the first portion of the outer cover plate 300. The conductive coil 313 is arranged on a surface, away from the fingerprint sensing layer 312, of the outer cover plate 300, i.e., the conductive coil 313 is arranged on an outer surface of the outer cover plate 300. The outer cover plate 300 may be made of a strengthened glass, an organic glass or the like.

The first portion of the outer cover plate 300 may be a hollow region (not shown in FIG. 12), i.e., the first portion of the outer cover plate 300 is hollowed to expose the fingerprint sensing layer 312. The hollow region is surrounded by the conductive oil 313, and the conductive oil 313 is electrically connected to the driver chip (not shown in FIG. 12). Since a surface of the finger presents a convex shape and is soft, in the case that the finger scratches across the hollow region, a distance from the fingerprint to the fingerprint sensing layer 312 may be reduced, and the accuracy of fingerprint identification may be improved due to the provided hollow region. The outer cover plate 300 may have a small thickness, thereby reducing the distance from the fingerprint to the fingerprint sensing layer and improving the accuracy of the fingerprint identification.

According to other embodiments of the disclosure, the conductive coil may be located on a surface of the outer cover plate 300 facing to the first substrate, i.e., located on an inner surface of the outer cover plate 300. In this case, there may be no hollow region provided at the first portion of the outer cover plate. According to other embodiments of the disclosure, the surface of the outer cover plate 300 may be provided with no conductive coil.

According to the embodiment, the conductive coil 313 is provided on the outer surface of the outer cover plate 300, and the detection mode shown in FIG. 8 may be adopted, which is not repeated here.

Since the conductive coil 313 is provided on the outer surface of the outer cover plate 300 according to the embodiment, subsequently, the finger may directly contacts the conductive coil 313. Therefore, the drive signal sent by the driver chip may be more effectively sent to the finger. In addition, since the first portion of the outer cover plate 300 is the hollow region, the fingerprint of the finger may be close to the fingerprint sensing layer 312 in the case that the finger scratches across the hollow region, and accordingly, the accuracy of fingerprint sensing of the fingerprint sensing layer 312 may be improved.

According to the embodiment, the conductive coil 313 is provided above and around the fingerprint sensing layer 312. The excitation signal is sent to the finger by the conductive coil 313, and then the sensing signal generated by coupling the finger with the fingerprint sensing unit is received. Thus, a signal-noise ratio of the fingerprint sensing is greatly raised and the accuracy of fingerprint identification is improved. Therefore, in the display device with the conductive 313, the distance from the finger to the fingerprint sensing layer 312 may be increased properly. Hence, there may be more choices of positions for arranging the fingerprint sensing layer 312, and accordingly, a structure of the display device may be designed more flexibly.

According to other embodiments of the disclosure, the conductive coil may be not provided. In the case that there is no conductive coil, the detection mode as shown in FIG. 4 is adopted, which is not repeated here.

As shown in FIG. 12, the display device further includes a pixel driving layer (not labeled in FIG. 12), which is provided in the second display region 320V of the second substrate 320 and is for driving and controlling a pixel. The pixel driving layer includes a common electrode layer 321, a passivation layer 322 and a pixel electrode layer 323. The pixel electrode layer 323 may have multiple pixel electrodes (not shown in FIG. 12).

As shown in FIG. 12, the display device further includes a first polarizer 301 located above the first substrate 310 and a second polarizer 302 located below the second substrate 320.

Liquid crystal or electronic ink may be provided between the first substrate 310 and the second substrate 320, although it is not shown in FIG. 12. A color filter layer may be provided on the first substrate 310. The color filter layer is provided in the first display region 310V and is for filtering light. In this case, the first substrate 310 acts as a color filter substrate, and the display device is a liquid crystal display.

According to the embodiment, a transverse electric field is generated between the common electrode layer 321 and the pixel electrode layer 323. An electric field direction of the transverse electric field is shown as double-headed arrows (unlabeled) in FIG. 12. In this case, the display device may be a fringe field switching type liquid crystal display or a transverse electric field type liquid crystal display. According to other embodiments of the disclosure, the display device may be other types of liquid crystal display, which is not limited in the disclosure.

It should be noted that, according to other embodiments of the disclosure, there may be no color filter layer on the first substrate 310. In this case, the display device is an e-paper. In the case that the display device is the liquid crystal display or the e-paper, the display device may be provided with a backlight (not shown in FIG. 12), which is located on one side of the second substrate 320, where the side of the second substrate is away from the first substrate 310, i.e., the backlight is located below the second polarizer 302 shown in FIG. 12.

It should be noted that, according to other embodiments of the disclosure, in the case that no color filter layer is provided on the first substrate 310, an organic light emitting layer may be provided between the first substrate 310 and the second substrate 320, while no liquid crystal or electronic ink is provided between the first substrate 310 and the second substrate 320. In this case, structures of respective layers on the second substrate 320 may be adjusted, and there may be no polarizer provided between the first substrate 310 and the second substrate 320, thereby making the display device into an organic light emitting diode display.

The display device according to the embodiment includes the first substrate 310 and the second substrate 320. The display device further includes the fingerprint sensing layer 312 located in the second non-display region 320I. Since the fingerprint may be sensed and identified by the fingerprint sensing layer 312, the display device has a function of sensing and identifying the fingerprint. Since the fingerprint sensing layer is integrated on the first substrate 310 of the display device, the thickness and the volume of the display device are barely increased, and a cost of the display device is saved.

Figure 13:
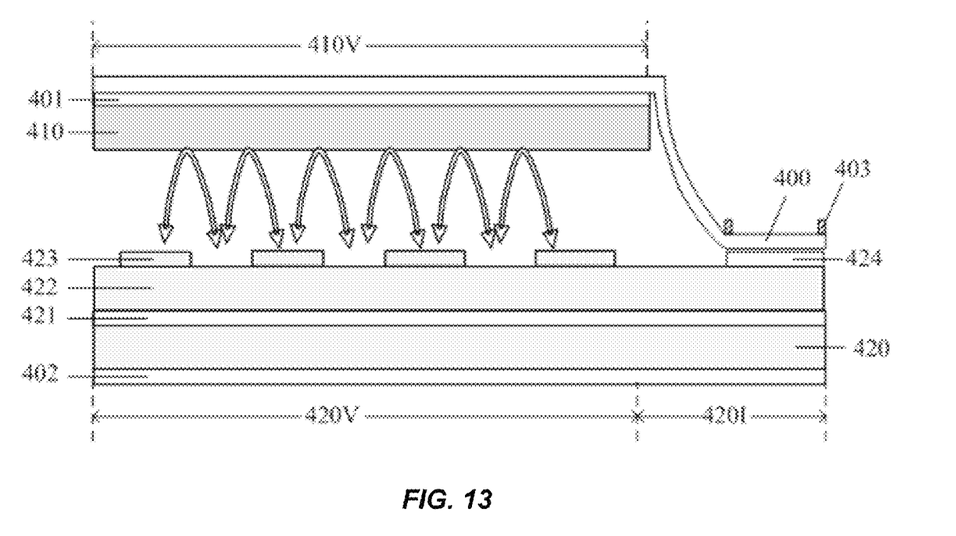
FIG. 13 is a schematic sectional view of a display device according to another embodiment of the disclosure.

As shown in FIG. 13, a display device is provided according to an embodiment of the disclosure. The display device includes: a first substrate 410 and a second substrate 420 opposite to the first substrate 410. The first substrate 410 has a first display region 410V and a first non-display region. According to the embodiment, an area of the first non-display region is zero, i.e., a whole region of the first substrate 410 is located in the first display region 410V. The second substrate 420 has a second display region 420V and a second non-display region 420I, with which the second substrate 420 is divided into two adjacent portions.

As shown in FIG. 13, the display device further includes a fingerprint sensing layer 424, which is located in the second non-display region 420I of the second substrate 420 and is located on an upper surface of the second substrate 420, i.e., a surface of the second substrate 420, the surface of the second substrate facing the first substrate 410. The fingerprint sensing layer 424 is for sensing and identifying a fingerprint. It should be noted that according to other embodiments of the disclosure, the fingerprint sensing layer 424 may be located on a lower surface of the second substrate 420.

A structure and properties of the fingerprint sensing layer 424 may be referred to corresponding contents in foregoing embodiments. The structure of the fingerprint sensing layer 424 is not limited in the disclosure.

As shown in FIG. 13, the display device further includes a touch layer provided in the second display region 420V of the second substrate 420. The touch layer is for detecting a touch operation. The touch operation generally refers to input operations performed by approaching or touching a surface of the display device by a finger or a touch stylus. Since the touch layer is also located on the upper surface of the second substrate 420, and the touch layer and the fingerprint sensing layer 424 may be located on a same layer on the upper surface of the second substrate 420, the touch layer and the fingerprint sensing layer 424 may be simultaneously manufactured with a same process. Therefore, processes are simplified and a cost is saved.

The touch layer may include multiple touch electrodes arranged in a matrix and wires connected the touch electrodes. The touch layer further includes pins located in the non-display region. The touch electrodes may be electrically connected to the pins located in the non-display region via the wires. It should be noted that according to other embodiments of the disclosure, the touch layer may have other structures, for example, the touch electrodes may be triangular, pentagonal or hexagonal. The wires connected to the touch units may have other connection modes, for example, the wires are leaded out from two sides of one row or one column of touch electrodes. According to other embodiments of the disclosure, in the case that the fingerprint sensing layer is located in the second display region of the second substrate, the touch layer may be located on the lower surface of the second substrate, or located in the first display region of the first substrate, for example, the touch layer may be located on the upper surface or the lower surface of the first substrate. The touch layer may have a multiple-layer structure. Multiple layers may be located on one surface or may be located on different surfaces. For example, some of the multiple layers are located on a surface of the first substrate and some of the multiple layers are located on a surface of the second substrate. A structure and a position of the touch layer are not limited in the disclosure.

It should be noted that according to other embodiments of the disclosure, there may be no touch layer in the display device. In this case, the display device is still provided with the fingerprint sensing layer 424. Compared with a conventional display device, the display device provided in the disclosure still has a function of sensing and identifying the fingerprint, a structure of the display device is compact and a cost is reduced.

The display device further includes a flexible outer cover plate 400, which is located on one side of the first substrate 410 away from the second substrate 420. A portion of the flexible outer cover plate 400 bends and extends to the second non-display region 420I to cover the fingerprint sensing layer 424. A conductive coil 403 is provided at the portion of the flexible outer cover plate 400 covering the fingerprint sensing layer 424. Since FIG. 13 is a sectional view, only two sections of the conductive coil 403 are shown in FIG. 13. The conductive coil 403 is located on a surface of the flexible outer cover plate 400 away from fingerprint sensing layer 424. Same as the previous embodiment, the portion of the outer cover plate 400 covering the fingerprint sensing layer 424 may be a hollow region, i.e., the portion of the outer cover plate 400 covering the fingerprint sensing layer 424 is hollowed to expose the fingerprint sensing layer 424. The hollow region is surrounded by the conductive oil 403, and the conductive oil 403 is electrically connected to a driver chip (not shown in FIG. 13). The flexible outer cover plate 400 may be made of organic materials such as polyethylene terephthalate (PET), Polycarbonate (PC), Polymethyl methacrylate (PMMA) or Polyethylene Naphthalate (PEN).

According to the embodiment, a sensing mode of the fingerprint sensing layer 424 may be referred to corresponding contents in the foregoing embodiments, which is not repeated herein.

As shown in FIG. 13, the display device further includes a pixel driving layer (unlabeled in FIG. 13), which is provided in the second display region 420V of the second substrate 420 and is for driving and controlling a pixel. The pixel driving layer includes a common electrode layer 421, a passivation layer 422 and a pixel electrode layer 423. The pixel electrode layer 423 may have multiple pixel electrodes. The pixel driving layer may further include multiple thin film transistors. The thin film transistors correspondingly control the pixel electrodes. Gate electrodes and source electrodes of the thin film transistors are respectively electrically connected to scan lines and data lines, to form a thin film transistor array. A transverse electric field is generated between the pixel electrode layer 423 and the common electrode layer 422, which is shown as double-headed arrows (unlabeled) in FIG. 13.

According to the embodiment, the touch layer may be located in a same layer as the common electrode layer 421, i.e., the common electrode layer 421 doubles as the touch layer.

As shown in FIG. 13, a liquid crystal layer or electronic ink may be provided between the first substrate 410 and the second substrate 420. A first polarizer 401 is located above the first substrate 410 and a second polarizer 402 is located below the second substrate. A backlight may be provided on one side of the second substrate 420 away from the first substrate 410. A color filter layer may be further provided on the first substrate 410. An organic light emitting layer may be further provided between the first substrate 410 and the second substrate 420. It may be referred to corresponding contents in the foregoing embodiments.

What is disclosed as above is not intended to limit the disclosure. Various variations and modifications may be made to the disclosure by those skilled in the art without departing from the spirit and scope of the disclosure. Therefore the scope of protection of the disclosure should be defined by claims.

What is claimed is:

1. A color filter substrate, comprising:
   a substrate having a display region and a non-display region;
   a color filter layer located in the display region and configured to filter light; and
   a fingerprint sensing layer located in the non-display region and configured to sense and identify a fingerprint,
   wherein the fingerprint sensing layer comprises a plurality of fingerprint sensing units arranged in an array,
   each of the fingerprint sensing units comprises at least one capacitor, and
   the fingerprint is identified by detecting a capacitance of the at least one capacitor.

2. The color filter substrate according to claim 1, further comprising a touch layer located in the display region and configured to detect a touch operation, wherein the fingerprint sensing layer and the touch layer are located on one surface of the substrate.

3. The color filter substrate according to claim 1, wherein:
   the fingerprint sensing layer is a scratch-type fingerprint sensing layer and
   all of the fingerprint sensing units are electrically connected to a driver chip via wires.

4. The color filter substrate according to claim 3, wherein:
   an excitation signal is sent to the fingerprint sensing unit by the driver chip,
   a finger is coupled with the fingerprint sensing unit,
   in response to the excitation signal sensing signal is generated by the fingerprint sensing unit,
   the sensing signal is sent to the driver chip by the fingerprint sensing unit, and
   fingerprint information is acquired by the driver chip based on the sensing signal.

5. The color filter substrate according to claim 3, further comprising a conductive coil surrounding the fingerprint sensing layer.

6. The color filter substrate according to claim 5, wherein:
   an excitation signal is sent to the conductive coil by the driver chip,
   the excitation signal is transmitted to a finger by the conductive coil,
   the finger is coupled with the fingerprint sensing unit,
   in response to the excitation signal a sensing signal is generated by the fingerprint sensing unit,
   the sensing signal is sent to the driver chip by the fingerprint sensing unit, and
   fingerprint information is acquired by the driver chip based on the sensing signal.

7. An array substrate, comprising:
   a substrate having a display region and a non-display region;
   a pixel driving layer located in the display region and configured to drive and control a pixel; and
   a fingerprint sensing layer located in the non-display region and configured to sense and identify a fingerprint,
   wherein the fingerprint sensing layer comprises a plurality of fingerprint sensing units arranged in an array,
   each of the fingerprint sensing units comprises at least one capacitor, and
   the fingerprint is identified by detecting a capacitance of the at least one capacitor.

8. The array substrate according to claim 7, further comprising a touch layer located in the display region and configured to detect a touch operation, wherein the fingerprint sensing layer and the touch layer are located on one surface of the substrate.

9. The array substrate according to claim 7, wherein:
   the fingerprint sensing layer is a scratch-type fingerprint sensing layer and
   all of the fingerprint sensing units are electrically connected to a driver chip via wires.

10. The array substrate according to claim 9, wherein:
    an excitation signal is sent to the fingerprint sensing unit by the driver chip,
    a finger is coupled with the fingerprint sensing unit,
    in response to the excitation signal a sensing signal is generated by the fingerprint sensing unit,
    the sensing signal is sent to the driver chip by the fingerprint sensing unit, and
    fingerprint information is acquired by the driver chip based on the sensing signal.

11. The array substrate according to claim 9, further comprising a conductive coil surrounding the fingerprint sensing layer.

12. The array substrate according to claim 11, wherein:
    an excitation signal is sent to the conductive coil by the driver chip,
    the excitation signal is transmitted to a finger by the conductive coil,
    the finger is coupled with the fingerprint sensing unit,
    in response to the excitation signal a sensing signal is generated by the fingerprint sensing unit,
    the sensing signal is sent to the driver chip by the fingerprint sensing unit, and
    fingerprint information is acquired by the driver chip based on the sensing signal.

13. A display device, comprising:
    a first substrate having a first display region and a first non-display region;
    a second substrate arranged opposite to the first substrate and having a second display region and a second non-display region;
    a pixel driving layer located in the second display region and configured to drive and control a pixel; and
    a fingerprint sensing layer located in the first non-display region or in the second non-display region and configured to sense and identify a fingerprint,
    wherein the fingerprint sensing layer comprises a plurality of fingerprint sensing units arranged in an array,
    each of the fingerprint sensing units comprises at least one capacitor, and
    the fingerprint is identified by detecting a capacitance of the at least one capacitor.

14. The display device according to claim 13, further comprising a touch layer located in at least one of the first display region and the second display region.

15. The display device according to claim 13, wherein:
    the fingerprint sensing layer is a scratch-type fingerprint sensing layer and
    all of the fingerprint sensing units are electrically connected to a driver chip via wires.

16. The display device according to claim 15, wherein:
    an excitation signal is sent to the fingerprint sensing unit by the driver chip,
    a finger is coupled with the fingerprint sensing unit,
    in response to the excitation signal a sensing signal is generated by the fingerprint sensing unit,
    the sensing signal is sent to the driver chip by the fingerprint sensing unit, and fingerprint information is acquired by the driver chip based on the sensing signal.

17. The display device according to claim 15, further comprising a conductive coil, wherein:
the conductive coil is located on the outer cover plate, on the first substrate, or on the second substrate, and is electrically connected to the driver chip,
the conductive coil surrounds the fingerprint sensing layer or a projection of the fingerprint sensing layer onto a region surrounded by the conductive coil.

18. The display device according to claim 17, wherein:
an excitation signal is sent to the conductive coil by the driver chip,
the excitation signal is transmitted to a finger by the conductive coil,
the finger is coupled with the fingerprint sensing unit,
in response to the excitation signal a sensing signal is generated by the fingerprint sensing unit,
the sensing signal is sent to the driver chip by the fingerprint sensing unit, and
fingerprint information is acquired by the driver chip based on the sensing signal.

19. The display device according to claim 18, wherein:
a projection of the fingerprint sensing layer onto the outer cover plate coincides with a first portion of the outer cover plate,
the first portion of the outer cover plate is a hollow region,
the conductive oil surrounds the hollow region, and
the conductive coil is located on a surface of the outer cover plate, wherein the surface of the outer cover plate faces away from the first substrate.

20. The display device according to claim 18, wherein:
the outer cover plate is flexible,
a portion of the flexible cover plate is configured to bend toward the second non-display region and covers at least a part of the second non-display region to cover the fingerprint sensing layer, and
the conductive coil is located on a surface of the flexible cover plate, wherein the surface of the flexible cover plate faces away from the first substrate.

21. The color filter substrate according to claim 1, wherein in a case that the fingerprint is identified, a part of fingerprint sensing units face a valley of the fingerprint and the other part of fingerprint sensing units face a ridge of the fingerprint, and a capacitance of the capacitor of the fingerprint sensing unit facing the valley of the fingerprint is different from a capacitance of the capacitor of the fingerprint sensing unit facing the ridge of the fingerprint.

22. The array substrate according to claim 7, wherein in a case that the fingerprint is identified, a part of fingerprint sensing units face a valley of the fingerprint and the other part of fingerprint sensing units face a ridge of the fingerprint, and a capacitance of the capacitor of the fingerprint sensing unit facing the valley of the fingerprint is different from a capacitance of the capacitor of the fingerprint sensing unit facing the ridge of the fingerprint.

23. The display device according to claim 13, wherein in a case that the fingerprint is identified, a part of fingerprint sensing units face a valley of the fingerprint and the other part of fingerprint sensing units face a ridge of the fingerprint, and a capacitance of the capacitor of the fingerprint sensing unit facing the valley of the fingerprint is different from a capacitance of the capacitor of the fingerprint sensing unit facing the ridge of the fingerprint.

* * * * *